United States Patent
Davis et al.

[15] 3,665,045
[45] May 23, 1972

[54] FRACTIONATION OF EUTECTIC MIXTURES OF DIMETHYLNAPTHALENES BY DIANHYDRIDE COMPLEXATION

[72] Inventors: Ronald I. Davis, Wilmington, Del.; Kenneth A. Scott, Swarthmore, Pa.

[73] Assignee: Sun Oil Company, Philadelphia, Pa.

[22] Filed: May 1, 1970

[21] Appl. No.: 33,980

[52] U.S. Cl. ..................................................260/674 N
[51] Int. Cl. ..................................................C07c 7/00
[58] Field of Search ........................................260/674 N

[56] References Cited

UNITED STATES PATENTS

| | | | |
|---|---|---|---|
| 2,885,453 | 5/1959 | Fishel | 260/674 |
| 2,941,017 | 6/1960 | Veatch et al. | 260/674 |
| 2,914,581 | 11/1959 | Christensen et al. | 260/674 |

OTHER PUBLICATIONS

Naletova et al., Chemical Abstract, Vol. 68, Abstract No. 24782m 1967.

*Primary Examiner*—Delbert E. Gantz
*Assistant Examiner*—C. E. Spresser
*Attorney*—George L. Church, Donald R. Johnson and Wilmer E. McCorquodale, Jr.

[57] ABSTRACT

Binary eutectics of dimethylnapthalenes having each methyl group at a $\beta$ position cannot be fractionated by crystallization and are difficult to fractionate by distillation. However, by dissolving the normally solid eutectic in an inert solvent and contacting the resulting solution with a dianhydride of 1,2,4,5,-benzenetetracarboxylic acid or a dianhydride of 1,2,3,4-benzenetetracarboxylic acid, a solid complex is formed. Separation of the solid complex and its subsequent decomposition results in a complexate that is substantially richer in a dimethylnapthalene which is preferentially complexed. Dimethylnaphthalenes are oxidized to naphthalenecarboxylic acids which are used in the production of dyes and pigments.

9 Claims, No Drawings

FRACTIONATION OF EUTECTIC MIXTURES OF DIMETHYLNAPTHALENES BY DIANHYDRIDE COMPLEXATION

CROSS REFERENCES TO RELATED APPLICATIONS

The present application is copending with the following listed applications filed of even date herewith, all applications being of common ownership.

| Ser. No. | Inventor(s) | Title |
| --- | --- | --- |
| 33,981 | R. I. Davis<br>K. A. Scott | "Fractionation of $C_{12}$ Bicyclic Aromatic Hydrocarbons by Di or Trianhydride Complex Formation" |
| 33,949 | R. I. Davis | "Fractionation of $C_{12}$ Bicyclic Aromatic Hydrocarbons by Tetrachlorophthalic Anhydride Complex Formation" |
| 33,951 | K. A. Scott | "Fractionation of $C_{12}$ Bicyclic Aromatic Hydrocarbons by 2-Chloro, 4-Nitrobenzoic Acid Complex Formation" |
| 33,950 | R. I. Davis | "Fractionation of $C_{13}$ Bicyclic Aromatic Hydrocarbons by Di or Trianhydride Complex Formation" |

BACKGROUND OF THE INVENTION

This invention relates to a process for fractionating binary eutectics of dimethylnaphthalenes having each methyl group at a β position. Said eutectic mixtures consist essentially of 2,6- and 2,7-dimethylnaphthalenes or 2,3- and 2,6-dimethylnaphthalenes or 2,3- and 2,7-dimethylnaphthalenes.

Dimethylnaphthalenes are oxidized to naphthalenecarboxylic acids which are used in the production of dyes and pigments. A more detailed discussion of the utility of dimethylnaphthalenes appears in "Naphthalenecarboxylic Acids" by K. A. Scott in Kirk-Othmer, *ENCYCLOPEDIA OF CHEMICAL TECHNOLOGY*, 2nd Edition, Vol. 13.

For convenience dimethylnaphthalene or dimethylnaphthalenes herein will be referred to as DMN with specific DMN isomers being indicated by reference to the location of the methyl groups. For example, 2,6-dimethylnaphthalene will be referred to as 2,6-DMN.

DMN are found in coal tar, lignite tar, crude oil, the drip-oil fraction produced during the pyrolysis of hydrocarbons to make olefins, in heavy petroleum reformate and in petroleum gas oil produced by catalytic cracking. In these hydrocarbon mixtures DMN are usually present in rather dilute concentration. For example, one analysis shows DMN making up about 4 percent by weight of a gas oil. However, by known processes such as distillation, crystallization and solvent extraction, DMN can be recovered in concentrated form from the previously mentioned sources.

However, by the aforementioned known processes, the resulting concentrated DMN can be a binary eutectic of DMN, i.e., 2,6- and 2,7-DMN or 2,3- and 2,6-DMN or 2,3- and 2,7-DMN. The weight or mole concentration of binary eutectics, along with their freezing points, are shown in the following Table I.

TABLE I

Eutectics of DMN*

| Weight or Mole Percent | | | Eutectic |
| --- | --- | --- | --- |
| 2,6-DMN | 2,7-DMN | 2,3-DMN | Freezing Point, °F. |
| 41.5 | 58.5 | — | 160 |
| 47.5 | — | 52.5 | 170 |
| — | 55.7 | 44.3 | 157 |

*Bulletin De L'Academic Polonaise Des Sciences Vol. IX. No. 11, 1961; On Solid-Liquid Equilibria between Coal-Tar Constituents, T. Gruberski.

Thus, for example, since both 2,6-DMN and 2,7-DMN have a boiling point of 504° F., further fractionation of this DMN eutectic by either crystallization or distillation is impossible. The DMN in the other eutectics have sufficiently close boiling points to make distillation difficult.

Yet in oxidizing these DMN compounds to naphthalenecarboxylic acids, it is preferable that each isomer be oxidized by itself since each one requires somewhat different reaction conditions for optimum oxidation. Also, a single acid may be wanted. Thus, there is a need for a method for separating a DMN eutectic into its isomers.

SUMMARY OF THE INVENTION

This invention relates to a method for the fractionation of a binary eutectic of DMN by selective complexing with the dianhydride of 1,2,4,5-benzenetetracarboxylic acid or the dianhydride of 1,2,3,4-benzenetetracarboxylic acid. The normally solid eutectic is dissolved in an inert solvent and contacted with either of these dianhydrides. The resulting solid DMN-dianhydride complex is separated from the liquid solution. The solid complex is decomposed and the subsequently released DMN has a composition substantially different from the original eutectic.

DESCRIPTION

The complexing agent used in this invention is the dianhydride of 1,2,4,5-benzenetetracarboxylic acid, also known as pyromellitic dianhydride or dianhydride of 1,2,3,4-benzenetetracarboxylic acid. These two dianhydrides for convenience are referred to herein as PMDA (I) and DA (II), respectively. The structures representing these two dianhydrides are as follows:

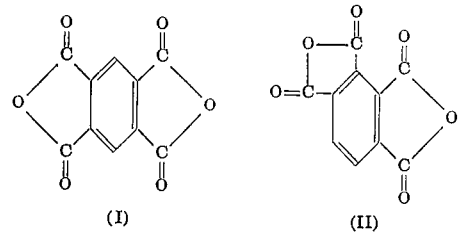

(I)         (II)

Surprisingly, the trianhydride of 1,2,3,4,5,6-benzenehexacarboxylic acid will not complex with the eutectic of 2,6-DMN and 2,7-DMN.

It is believed that the complexes formed herein are π-complexes, i.e., they are caused by combination between the π electrons of the two rings involved. The dianhydride apparently accepts a share in the π electrons of the compound which is complexed with it. Steric factors appear to have a strong effect, since according to the theory of π complex formation, the two rings must be close together and parallel in order for the complex to form. These complexes are distinct from the acid-base type as exemplified by complexes of HF·BF$_3$ and xylenes and also from clathrate complexes of, for example, the urea-paraffin type.

The amount of dianhydride employed in the complexing step can vary over a wide range depending upon the fractionation desired. The amount of dianhydride used is related to the amount of DMN present. If an extremely large ratio of dianhydride to DMN is used and sufficient time allowed, all the DMN would complex and no DMN fractionation could be obtained. On the other hand, the amount of dianhydride used can be greater than the amount necessary to ultimately form a complexate containing all the DMN in the eutectic being treated if the length of time of contacting is relatively short. Preferably, the amount of dianhydride contacting the dissolved eutectic is in the range from 0.01 to 3.0 moles of dianhydride per mole of DMN. A more preferable range is from 0.10 to 1.5 moles of dianhydride per mole of DMN.

A DMN eutectic is solid at room temperature, but for complexation to occur substantially all the eutectic must be dissolved in an inert solvent. The solvent must be one that will not react with the dianhydride but one in which the eutectic will dissolve. Inert solvents such as $C_5$ to $C_{20}$ alkanes, alkenes, cycloalkanes, cycloalkenes or mixtures thereof, $CCl_4$ and ethers are suitable. Of the $C_5$ to $C_{20}$ hydrocarbons, the alkanes are preferable because of their lower cost. Some examples of suitable ethers are: diethyl ether, diisopropyl ether, ethyl n-butyl ether, divinyl ether, di-n-hexyl ether.

In addition, there is some minimum DMN concentration in an inert solvent at which complexation will not occur. For example, if a simple mixture of decane and 2,6-DMN at ambient temperature is treated with a molar excess of PMDA, no complex will form if the concentration of the 2,6-DMN is less than about 1 weight percent. Also, if a simple mixture of decane and 2,7-DMN at ambient temperature is treated with a molar excess of PMDA, no complex will form if the concentration of 2,7-DMN is less than about 3 weight percent. As discussed hereinafter, this minimum concentration phenomenon can be used to release the DMN from the formed complex. As for other combinations of DMN and dianhydride, this minimum concentration can be determined by the methods discussed hereinafter.

Complexing occurs over a relatively wide temperature range with the rate of complex formation increasing with increasing temperature. The lower temperature limits are dictated by practical considerations regarding the rate of complex formation. The upper temperature limits of the process are governed by the thermal stability of a given complex. Thus it is apparent that the optimum temperature for the operation of the present process depends upon both the rate of complex formation and the stability factor.

In general, the highest temperature employed will be below the melting point of the dianhydride, i.e., 540°–546° F. for PMDA and 382°–386° F. for DA.

In general, the lowest temperature employed will be above the freezing or melting point of the inert solvent. For example, pentane has a freezing point of about −200° F. and eicosane has a melting point of about 97° F., cyclohexane 45° F., 1-hexane 220° F. and cyclohexene 153° F.

The preferred temperature range for the complexing step is between 100°–375° F., more preferably between 100°–350° F.

The solid complex is readily separated from the solvent-DMN-anhydride mixture. Filtration, decantation or centrifugation can be used to remove the complex. Separation of the complex from the mixture is ordinarily performed at a temperature below about 150° F.; temperatures between 50° and 100° F. are particularly effective for dianhydride-DMN complex separation. Lower separation temperatures, e.g., 0° F., can also be used.

DMN can easily be separated from the complex by heating the latter under vacuum and recovering the DMN as a distillate. By employing such a preferred operation, the dianhydride is regenerated and can be reused for further complexing. Recovery of the DMN can also be done by elution of the complex with an inert solvent such as decane or destruction of the dianhydride by such agents as water or an aqueous base.

If an inert solvent is used to elute the complex, a sufficient quantity must be used. The quantity necessary can depend on the particular DMN in the complex and the temperature used. Thus, for example, if a 2,6-DMN-PMDA complex is eluted at an ambient temperature with a $C_5$ to $C_{20}$ alkane, such as decane, the amount of decane used must be such that the resulting concentration of 2,6-DMN in the 2,6-DMN-decane mixture is less than one weight percent. However, if the temperature of elution is higher than ambient temperature, the concentration of 2,6-DMN in the resulting 2,6-DMN-decane mixture can be greater than one weight percent.

Thus in this invention a DMN eutectic is placed in a suitable inert solvent, preferably $C_5$ to $C_{20}$ alkane, and dissolved. The resulting solution is then contacted in the liquid phase with solid dianhydride. Alternatively, the solid dianhydride is placed in said solvent and then the eutectic dissolved. The amount of dianhydride used is sufficient to preferentially complex with one of the DMN. Generally, the temperature of contacting is lower than the melting point of the dianhydride. Furthermore, the temperature of the resulting mixture of DMN, solvent and dianhydride can be maintained at ambient temperature, e.g., 50°–100° F., until the desired or final complexation is reached. Alternatively, the temperature of the resulting mixture, after contacting at the ambient temperature, can be elevated to a higher temperature, the latter being less than the melting point of the dianhydride to reduce the time required to reach the desired complexation. The DMN-dianhydride complex can be separated from the resulting mixture at a suitable elevated temperature although it is preferred to separate the complex after the DMN-dianhydride-solvent mixture is at ambient temperature, i.e., 50°–100° F. However, separation can occur at lower temperatures, e.g., 0° F., or even just above the freezing or melting point of the solvent. Suitable agitation of the DMN-solvent-dianhydride mixture can occur during or after the addition of the dianhydride and/or during the heating and/or any cooling steps.

The solid DMN dianhydride complex can be decomposed in several ways. For example, after the solid DMN-dianhydride complex has been separated, the complex can be heated under vacuum and the DMN removed as distillate. Preferably, the complex should be washed to remove liquid on the surface of the solids. This liquid will have a composition equal to the uncomplexed material and its presence reduces the effectiveness of separation. Another way to decompose the complex is to add a suitable inert solvent, i.e., $C_5$ to $C_{20}$ alkane, alkene, cycloalkane, cycloalkene and mixtures thereof, as a result of which the complex will decompose. The solvent should have a boiling point such that it can easily be separated from the DMN by distillation. The solid dianhydride is removed and the remaining, for example, DMN-alkane mixture fractionated.

An alternative procedure comprises adding a suitable inert solvent and raising the temperature of the resulting complex-solvent combination. Upon decomposition of the complex, the dianhydride is removed from the hot inert solvent and the remaining DMN-solvent mixture fractionated. In this latter technique, the use of elevated temperatures reduces the necessary amount of solvent.

Still another way to decompose the complex is to contact the separated DMN-dianhydride complex with a compound which will react with the dianhydride, thereby releasing the DMN. Among such materials are water, aqueous sodium hydroxide, aqueous calcium hydroxide, etc. The advantage of using aqueous sodium hydroxide, etc., is that the formation of a salt which dissolves in the water enhances the separation of the complexate from the water. When the dianhydride is not reacted with any compound to release the DMN, it can be used to contact untreated eutectic.

After complexation, the complexate and noncomplexate have compositions different from the starting eutectic thereby enabling either or both products to be treated to obtain pure DMN. For example, if a eutectic of 2,6-DMN and 2,7-DMN has been treated, the complexate can be treated further to isolate pure 2,6-DMN. Also, the noncomplexate material is enriched in 2,7-DMN, thereby permitting pure 2,7-DMN to be isolated from the noncomplexed fraction. Any eutectic of 2,6-DMN and 2,7-DMN formed by this additional processing can be complexed again with dianhydride and, subsequently, pure 2,6-DMN and pure 2,7-DMN can be isolated from the second eutectic.

The following examples illustrate this invention:

EXAMPLES I–III

Three runs were performed to show that PMDA will preferentially complex with 2,6-DMN in a eutectic mixture of 2,6-DMN and 2,7-DMN at various ratios of moles of PMDA per mole of DMN. The results of these runs are shown in the following Table II. In all runs the concentrations of 2,6-DMN in the complexate is substantially greater than that in the eutectic.

TABLE II

PMDA Complexation with Eutectic 2,6- & 2,7-DMN Mixture*

| Run | Moles PMDA per Mole of DMN | Weight Percent | | | |
|---|---|---|---|---|---|
| | | Complexate | | Noncomplexate | |
| | | 2,6-DMN | 2,7-DMN | 2,6-DMN | 2,7-DMN |
| 1 | 1.4 | 58.7 | 41.3 | 28.9 | 71.1 |
| 2 | 1.0 | 68.9 | 31.1 | 36.9 | 63.1 |
| 3 | 0.45 | 69.7 | 30.3 | 39.1 | 60.9 |

*Eutectic DMN mixture contains 41.5 weight percent 2,6-DMN and 58.5 weight percent 2,7-DMN In these three runs 10 grams of the solid eutectic containing 41.5 weight percent 2,6-DMN and 58.5 weight percent of 2,7-DMN were dissolved in 50 grams of decane. To the resulting solution, a suitable amount of PMDA was added. The resulting mixture was slowly heated to about 275° F. and then cooled to ambient temperature and allowed to remain at this lower temperature for about 30 minutes. Then the resulting mixture was filtered and the separated solid complex was washed with hexane and vacuum dried. The solid complex was placed in a sufficient amount of decane to decompose the complex and the mixture was heated to 250° F. The solid PMDA was filtered from the hot decane and complexate. The remaining liquid was stripped of decane to yield the complexate. Analyses of the complexate and noncomplexate are shown in the preceding Table II.

The PMDA used was a white powder with a purity of 98+ percent. Its melting point was 540°–560° F.; particle size was 95 percent less than 10 microns; its boiling point was 745°–752° F. and its specific gravity was 1.68.

The aforementioned eutectic can be fractionated in an analogous manner using DA. Similarly, the other binary eutectics can be fractionated in an analogous manner using either dianhydride, i.e., PMDA or DA.

The invention claimed is:

1. A method of fractionating a binary eutectic consisting essentially of dimethylnaphthalenes having each methyl group at a β position comprising:

a. dissolving said eutectic in an inert solvent and contacting resulting solution with a solid complexing dianhydride of 1,2,3,4-benzenetetracarboxylic acid or of 1,2,4,5-benzenetetracarboxylic acid at a temperature within the range from the melting point of the dianhydride to the freezing point of said solvent, to complex preferentially with one of the dimethylnaphthalenes and form a solid complex containing less than the total amount of dimethylnaphthalenes in said eutectic;

b. separating the solid complex from the resulting admixture;

c. and decomposing the solid complex to recover the resulting complexate having a proportion of dimethylnaphthalenes different from that in the starting eutectic.

2. A method according to claim 1 wherein the solution of eutectic and solvent is contacted with the dianhydride at 50°–100° F., the temperature of said resulting admixture is increased to within the range from 100°–375° F. and the solid complex is separated at a temperature between the freezing point of the solvent and 100° F.

3. A method according to claim 1 wherein the temperature at which the dianhydride is contacted with the solution of eutectic and solvent is in the range from 100°–350° F. and the solid complex is separated at 0°–100° F.

4. A method according to claim 1 wherein the amount of dianhydride contacting the eutectic is in the range from 0.01 to 3.0 mole per mole of dimethylnaphthalene.

5. A method according to claim 1 wherein the eutectic consists of 2,6-dimethylnaphthalene and 2,7-dimethylnaphthalene, the inert solvent is alkane of the $C_5$ to $C_{20}$ range, the dianhydride is that of 1,2,4,5-benzenetetracarboxylic acid, the amount of said dianhydride contacting the mixture is in the range from 0.1 to 1.5 mole per mole of dimethylnaphthalenes, the temperature at which said dianhydride is contacted with the solution of eutectic and solvent is in the range from 100°–350° F. and the solid complex is separated at 0°–100 F.

6. A method according to claim 1 wherein the dianhydride is that of 1,2,4,5-benzenetetracarboxylic acid.

7. A method according to claim 6 wherein said eutectic is composed of 2,6-dimethylnaphthalene and 2,7-dimethylnaphthalene.

8. A method according to claim 1 wherein the dianhydride is that of 1,2,3,4-benzenetetracarboxylic acid.

9. A method according to claim 8 wherein said eutectic is composed of 2,6-dimethylnaphthalene and 2,7-dimethylnaphthalene.

* * * * *